United States Patent [19]
Lipo et al.

[11] Patent Number: 5,304,882
[45] Date of Patent: Apr. 19, 1994

[54] VARIABLE RELUCTANCE MOTORS WITH PERMANENT MAGNET EXCITATION

[75] Inventors: Thomas A. Lipo; Yuefeng Liao, both of Madison, Wis.

[73] Assignee: Electric Power Research Institute, Inc., Palo Alto, Calif.

[21] Appl. No.: 881,202

[22] Filed: May 11, 1992

[51] Int. Cl.⁵ .................................... H02K 21/12
[52] U.S. Cl. ...................... 310/156; 310/106; 310/184; 310/254; 310/269; 318/701
[58] Field of Search ............... 310/156, 254, 162, 179, 310/163, 180, 164, 184, 261, 269, 106; 318/701

[56] References Cited
U.S. PATENT DOCUMENTS

| | | | |
|---|---|---|---|
| 2,539,569 | 1/1951 | Clark | 171/212 |
| 2,816,240 | 12/1957 | Zimmerman | 310/155 |
| 3,616,761 | 11/1971 | Valls | 104/148 R |
| 3,679,924 | 7/1972 | Menzies | 310/163 |
| 3,783,502 | 1/1974 | Richter et al. | 29/598 |
| 3,862,445 | 1/1975 | Volkrodt | 310/154 |
| 3,984,711 | 10/1976 | Kordick | 310/49 R |
| 4,110,646 | 8/1978 | Rao | 310/163 |
| 4,322,648 | 3/1982 | Ray | 310/156 |
| 4,348,605 | 9/1982 | Torok | 310/168 |
| 4,472,651 | 9/1984 | Jones | 310/156 |
| 4,629,921 | 12/1986 | Gavaletz | 310/156 |
| 4,698,537 | 10/1987 | Byrne | 310/269 |
| 4,712,028 | 12/1987 | Horber | 310/49 R |
| 4,827,164 | 5/1989 | Horber | 310/49 R |
| 4,916,346 | 4/1990 | Kliman | 310/216 |
| 4,939,398 | 7/1990 | Lloyd | 310/156 |
| 5,051,640 | 9/1991 | Freise | 310/162 |
| 5,059,884 | 10/1991 | Shah et al. | 318/701 |
| 5,097,190 | 3/1992 | Lyons | 318/701 |
| 5,148,090 | 9/1992 | Oku | 310/269 |
| 5,180,960 | 1/1993 | Austermann | 318/701 |

*Primary Examiner*—R. Skudy
*Attorney, Agent, or Firm*—Leonard Bloom

[57] ABSTRACT

A new class of doubly-salient variable reluctance motors which provides greater output torque, higher efficiency, quicker response, and a simple structure in comparison to conventional reluctance motors by utilizing a specific stator/rotor pole arrangement and by altering the magnetic structure of the motor by using permanent magnets to provide a linearly increasing flux linkage over the entire area of pole overlap.

22 Claims, 7 Drawing Sheets

θr=0 degree

θr=15 degrees

Simulation Results for the RPM-VRM Motor at Low Speed

Simulation Results for the Prototype DSPM Motor at High Speed

VARIABLE RELUCTANCE MOTORS WITH PERMANENT MAGNET EXCITATION

BACKGROUND OF THE INVENTION

1. Field of the invention

The present invention relates to variable reluctance machines and, more particularly, to a high-output variable reluctance motor incorporating two or more rotating permanent magnets which alter the magnetic structure of the motor to magnetize the machine in the conventional manner and also to improve the flux linkage variation of each phase for more amenable operation with a power electronic converter.

2. Description of the Background

In a variable reluctance motor (VRM), torque is generated by a doubly-salient rotor and stator which tend to align themselves in order to reach a position of minimum magnetic reluctance. Under ideal switching conditions, VRMs have the potential to be highly efficient. Moreover, VRMs can be constructed with shorter end-windings, and they use less end-space. Hence, the length of the rotor and stator can be increased without adding to the overall motor dimensions or manufacturing costs. In this manner, the torque output can be increased substantially over a comparably-sized synchronous or induction motor.

Thus far, the VRM has fallen short of its above-described potential for two reasons. First of all, like all single excited motors, the VRM suffers from an "excitation penalty," i.e., the armature current must provide an excitation component, and thus has a lower efficiency and lower power factor (or energy ratio) as compared with motors wherein the sole purpose of the stator current is torque production. Secondly, ideal switching conditions do not exist, and attempts to achieve such conditions have resulted in commercially impractical converter circuits with excessive voltage and current stresses on the switching devices. In a variable reluctance motor, the current in each phase should be decreased to zero immediately when the rotor is aligned with that phase. The problem lies in a large turn-off inductance. It is difficult to accomplish this instantaneous current reduction because the phase inductance is a maximum when the rotor is aligned with that phase. Hence, the excitation current can be removed, but the inductance will draw a residual current from the energy stored in the magnetic field. The decaying residual current induces a detrimental reverse-torque as the rotor pole surpasses alignment with the corresponding stator pole. The problem is most serious when the speed of the motor is high.

As a result, those skilled in the art view present VRM technology with some skepticism. Synchronous or induction motors remain the industry choice.

It would be greatly advantageous to realize the full potential of a VRM by solving the above-described problems without increasing the complexity and cost of the converter or the motor.

SUMMARY OF THE INVENTION

It is, therefore, an object of the present invention to provide an improved variable reluctance motor which permits an economical variable speed drive system with greater output torque, higher efficiency, quicker response, and a simpler structure in comparison to conventional motor drives.

It is another object of the present invention to fully exploit the doubly-salient structure of an VRM as well as modern improvements in permanent magnet materials.

It is another object of the present invention to produce $\sqrt{2}$ to $2\sqrt{2}$ times the torque of a comparably-sized conventional variable reluctance motor having the same winding heat dissipation and degree of magnetic saturation.

It is still another object of the present invention to reduce the size and overall cost of the VRM drive system by using a power converter with minimum power rating.

It is a specific object of the invention to accomplish the above-described objects by altering the magnetic structure of an VRM in order to provide a linearly increasing flux linkage over the entire area of pole overlap.

It is yet another object of the invention to realize an electromagnetic structure which presents a low inductance to the associated power converter at the instants at which the current must be commutated (switched) into and out of an active stator winding.

It is a further object of the invention to reduce the size of the associated power converter by realizing this same reduction in the commutating inductance presented by the machine to the power converter during switching operations.

According to the present invention, the above-described and other objects are accomplished by providing a new type of variable reluctance motor with permanent magnet excitation. This new type of motor is termed a Rotary Permanent Magnet Variable Reluctance Motor (RPM-VRM), and it comprises a stator having six salient poles spaced at equal angular intervals, and three stator windings corresponding to three phases A-C, each stator winding being coiled around two diametric stator poles. The motor also includes a rotor having four salient poles spaced at equal angular intervals around a central axis. The rotor further comprises a plurality of planar permanent magnets parallelly located on opposing sides of the rotor axis to serve as a means of producing magnetizing flux. The magnets being so polarized as to magnetize as south magnetic poles the ones of said rotor salient poles lying on the same side of said central axis as one of said planes and to magnetize as north magnetic poles the ones of said rotor salient poles lying on the same side of said central axis as the other of said planes.

A second new type of motor is termed a Homopolar Permanent Magnet Variable Reluctance Motor (HPM-VRM), and it comprises a structure having two rotor stacks located axially on opposite ends of a rotor shaft, both rotor stacks having four projecting poles. Two stator stacks of six projecting poles each encircle the two pairs of rotor punchings. A permanent magnet is located on the rotor between the two rotor stacks for the purpose of producing magnetizing flux.

Two alternative converter topologies are also disclosed for driving the RPM-VRM and HPM-VRM. Both converters generally comprise a diode bridge for rectifying a three phase AC input and providing a DC output, a DC link capacitor connected in parallel with the diode bridge, and a plurality of switch pairs including a first switch through a third switch each connected in parallel with the DC link capacitor for applying the positive or negative values of the DC output to one of the short pitch windings.

BRIEF DESCRIPTION OF THE DRAWINGS

Other objects, features, and advantages of the present invention will become more apparent from the following detailed description of preferred embodiments and certain modifications thereof when taken together with the accompanying drawings in which.

DETAILED DESCRIPTION OF THE PREFERRED EMBODIMENT

Figure 1:
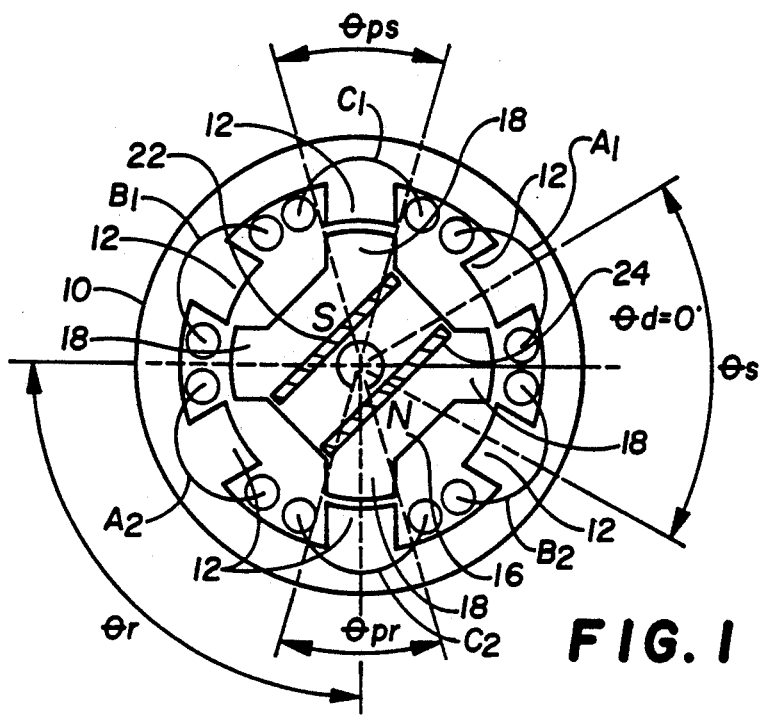
FIG. 1 shows a cross-section of one embodiment of the variable reluctance motor according to the present invention which is termed a Rotary Permanent Magnet Variable Reluctance Motor (RPM-VRM) because it incorporates permanent magnets in the rotor.

FIG. 1 shows a cross-section of a rotary permanent magnet variable reluctance motor (RPM-VRM) according to one embodiment of the present invention.

A stator 10 consists of a plurality of discrete laminated layers, each layer being punched to form six salient (or projecting) poles 12 positioned at angular intervals $\theta_s$ of $\pi/3$ radians. Each pole 12 has a pole arc $\theta_{ps}$ of $\pi/6$ radians.

The rotor 16 also consists of a plurality of discrete laminated layers each of which are punched to form four salient poles 18 positioned at angular intervals $\theta_r$ of $\pi/2$. Each pole 18 also has a pole arc $\theta_{pr}$ equal to or slightly greater than $\pi/6$ radians.

In the RPM-VRM embodiment of FIG. 1, stator 10 is wound with three short pitch windings or coils A', B', C', corresponding to three phase alternating current. Each short pitch winding (for example, the winding of phase A) further comprises two short pitch coils $A_{1-2}$ connected in series, each coil $A_1$ and $A_2$ being wound around a respective stator pole 12 corresponding to a diametric pair.

It will be appreciated by those skilled in the art that other suitable stator/rotor pole arrangements are possible. For example, multiples of 6/4 may be used, such as 12/8, etc. Similarly, combinations with other than three phases are possible. The essential feature is that the permanent magnets see a constant reluctance flux path at all times, that is, the total overlapping stator/rotor pole areas must remain constant.

The winding arrangement of FIG. 1 yields the following exemplary alternating phase sequence during one complete revolution:

$$A_1 \rightarrow C_1 \rightarrow B_1 \rightarrow A_2 \rightarrow C_2 \rightarrow B_2$$

An essential feature of the embodiment of FIG. 1 comprises two permanent magnets 22 and 24 which are embedded inside the rotor 16. For this reason, the embodiment of FIG. 1 is termed a Rotary Permanent Magnet Variable Reluctance Motor (RPM-VRM). Preferably, permanent magnets 22 and 24 are elongate planar magnets which are parallelly located and/or embedded on opposing sides of the rotor 16 axis. Permanent magnets 22 and 24 must have a $\pi/4$ angular displacement from an diametric rotor pole 18 pair. The existence of permanent magnets 22 and 24 effectively alters the magnetic structure of the motor. The permanent magnets 22 and 24 themselves generate the primary flux, and a secondary (armature reaction) flux is induced by the stator pole windings or coils A, B, C. Due to their air-like permeability, permanent magnets 22 and 24 present an large reluctance which blocks this secondary flux.

The particular stator pole 12 and rotor pole 18 arrangement of the present invention ensures that the total overlapped pole area remains constant for all positions of rotor 16. This way, the total air-gap reluctance (which is the primary reluctance for the permanent magnet excitation) is invariant of rotor 16 displacement $\theta_d$, and there exists a substantially linear transfer of permanent magnet flux between adjacent stator poles 12 during rotation of rotor 16. Consequently, permanent magnets 22 and 24 produce no coggius torque at us load.

At no load, the current in each stator 10 winding A', B', C' is the main torque-producing component, and permanent magnets 22 and 24 are positioned such that the flux linkage $\lambda$ variation of each stator 10 phase is substantially linear over the entire range of rotor 16 displacement $\theta_d$. Specifically, the flux linkage $\lambda$ of each stator 10 increases at a constant rate for continuing rotor 16 displacement $\theta_d$ until full alignment of a stator pole 12 and rotor pole 18 pair. Past alignment, the flux linkage $\lambda$ of that pole pair decreases at a constant rate.

In addition, permanent magnets 22 and 24 block the flux generated by stator poles 12, and past alignment the stator flux is forced to circulate through an adjacent overlapped pole pair rather than a diametric overlapped pole pair. This eliminates any detrimental net torque production past alignment.

Since torque is produced as a result of the change of flux linkage in the active stator winding(s) A', B', C', there is a reaction torque component caused by the interaction of stator winding current and the permanent magnet flux, and there is a reluctance torque component caused by the variation in the reluctance of the magnetic path of the winding A', B', C'. Hence, the present invention works on the variable reluctance principle as well as permanent magnet brushless DC motor principles.

Figure 2:
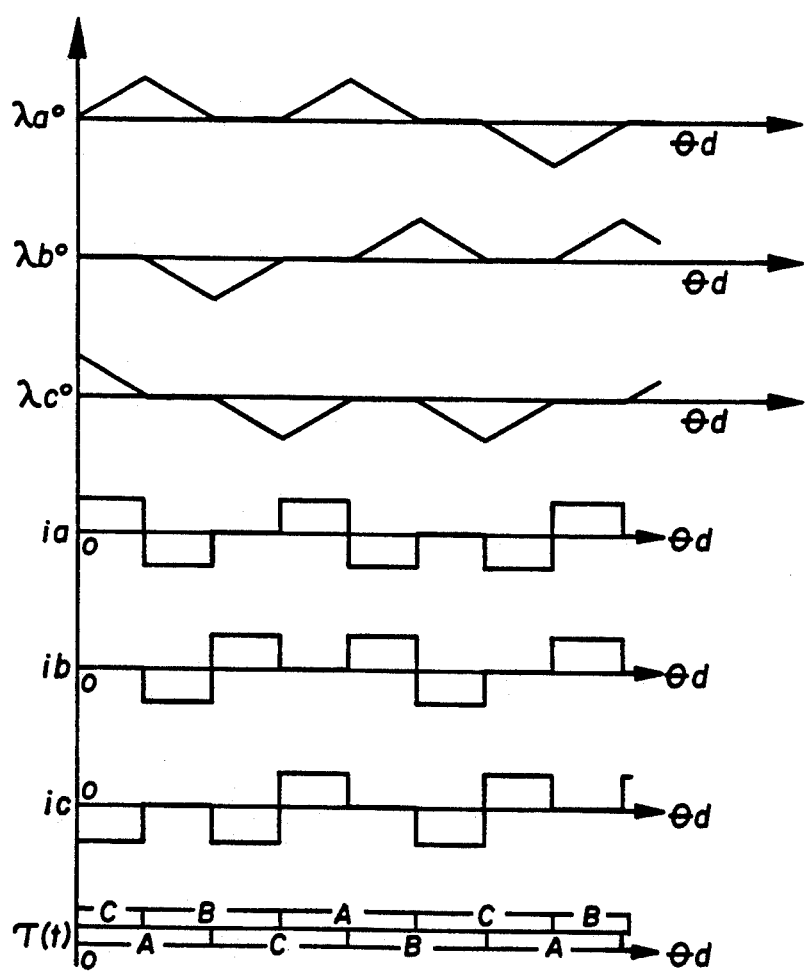
FIG. 2 is a graph of the flux linkages, the current commutation sequence, and the resulting torque on a per phase basis for the embodiment of FIG. 1

FIG. 2 shows the variations of the currents i and the corresponding flux linkages λ in each phase resulting from the rotating magnets. In the preferred mode of operation, positive current is injected into a given phase when the magnetic flux linking that phase is increasing, and negative current is injected when the magnetic flux is decreasing. Consequently, positive torque is produced over the entire area of overlap of an active stator pole 12 and rotor pole 18 pair. This essentially doubles the torque production when compared with a conventional VRM which can only produce torque while the phase inductance is increasing.

Figure 3:
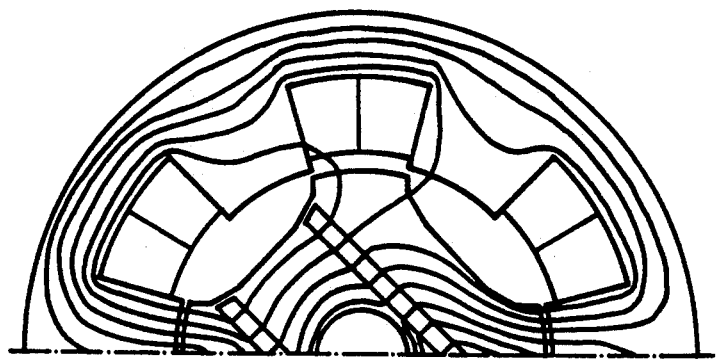
FIGS. 3 and 4 are finite element analyses of the flux contour plots for two time instants wherein the rotor displacement $\theta_d=0°$ and $\theta_d=15°$, respectively.
Figure 4:
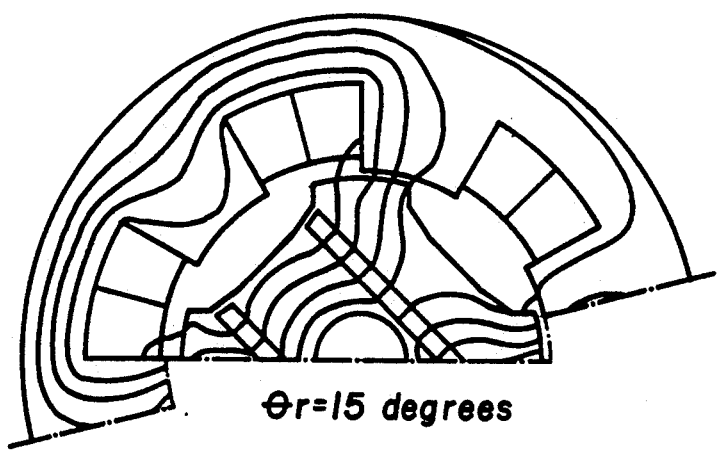

FIGS. 3 and 4 illustrate finite element analyses of the flux contour plots for two time instants wherein $\theta_d=0°$ and $\theta_d=15°$, respectively. In FIG. 3, two lateral diametric rotor poles are aligned with two corresponding stator poles, and it is at this position where the current in the aligned phase is reversed. At the illustrated position, the inductance of the aligned phase is at a minimum due to the presence of the high-permeability permanent magnets 22 and 24. This is in contrast to conventional VRMs which omit the permanent magnets, wherein the same fully aligned position would result in a maximum inductance.

FIG. 4 shows the position at which inductance is a maximum in the active phase. However, since switching takes place at $\theta_d=0, 30, 60$, etc., switching of the current in and out of a phase only takes place at the above-described minimum inductance positions.

Figure 5:
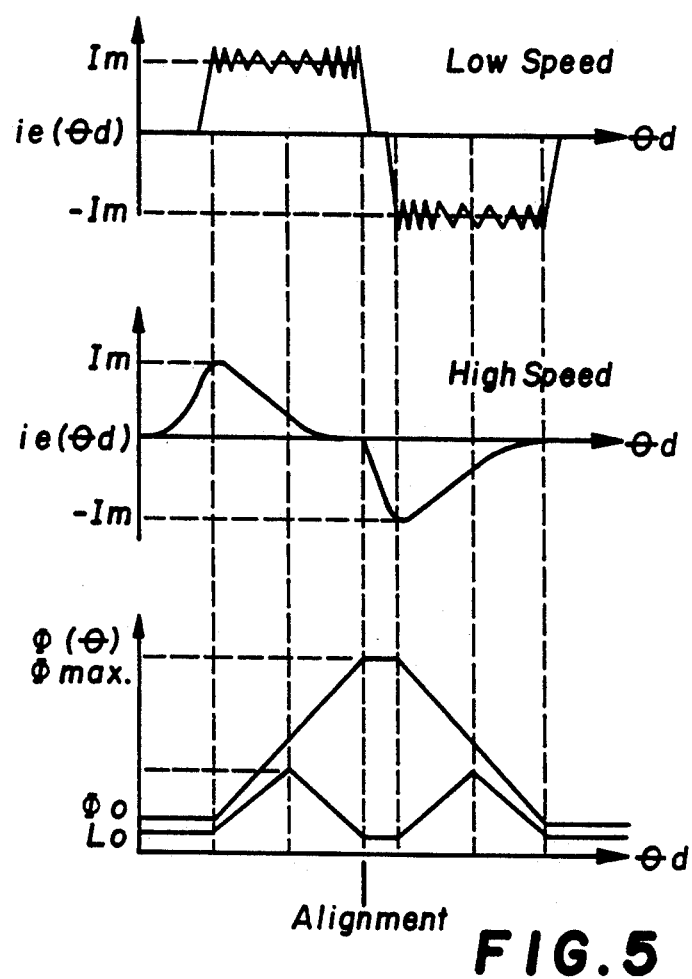
FIG. 5 is a graph of the current waveforms for the embodiment of FIG. 1

Referring to FIG. 5, the torque expression for the present invention may be derived as follows on per phase basis. The voltage equation in the active phase winding A' can be written as follows (neglecting all copper and iron losses):

$$V_a = E_a = \frac{d}{dt} \Phi_a$$

where $$\Phi_a = \Phi_{as} + \Phi_{am} = L_a I_a + K_\Phi \Phi_p \Theta_r$$

with

- $V_a$: voltage applied to phase winding A
- $E_a$: counter emf in phase winding A
- $I_a$: current in phase winding A
- $\Phi_a$: air gap flux linkages linking phase winding A and rotor (does not include leakage flux)
- $\Phi_{as}$: portion of $\Phi_a$ due to $I_a$
- $\Phi_{am}$: portion of $\Phi_a$ due to magnet
- $L_a$: inductance of phase winding A
- $K_\Phi$: proportionality constant between flux linkages linking stator pole produced by the magnet and flux produced by one pole of the magnet.

$$K_\Phi = \frac{N_\Phi}{B_s}$$

where

- $N_\Phi$: total series turns per phase
- $B_s$: stator pole width (in rad.)
- $\theta_r$: angle between stator pole axis and rotor pole axis
- $\Phi_p$: flux per pole $$\begin{aligned} V_a &= \frac{d}{dt}(L_a I_a) + K_\Phi \Phi_p \frac{d}{dt}\Theta_r \\ &= \left( I_a \frac{d}{dt} L_a + L_a \frac{d}{dt} I_a \right) + K_\Phi \Phi_p \omega \\ &= \left( I_a \frac{d}{dt} L_a + L_a \frac{d}{dt} I_a \right) + E_m \end{aligned}$$

The input power is thus $$\begin{aligned} P_e &= V_a I_a \\ &= I_a^2 \frac{d}{dt} L_a + L_a I_a \frac{d}{dt} I_a + E_M I_a \\ &= \left( \frac{1}{2} I_a^2 \frac{d}{dt} L_a + L_a I_a \frac{d}{dt} I_a \right) + \left( \frac{1}{2} I_a^2 \frac{d}{dt} L_a + E_m I_a \right) \\ &= \frac{d}{dt}\left( \frac{1}{2} I_a^2 L_a \right) + \left( \frac{1}{2} I_a^2 \left( \frac{d}{d\Theta_r} L_a \right) + \frac{E_m I_a}{\omega_r} \right) \omega_r \end{aligned}$$

Power balance gives $$P_e = \frac{d}{dt} W_f + T_e \omega_r$$

Hence we have $$\begin{aligned} T_e &= \frac{1}{2} \left( \frac{d}{d\Theta_r} L_a \right) I_a^2 + \frac{E_m I_a}{\omega_r} \\ &= T_{er} + T_{em} \end{aligned}$$

and $$W_f = \frac{1}{2} I_a^2 L_a$$

where:

- $P_e$: electrical power input to motor (watts)
- $T_e$: total electromagnetic torque of motor (newton-meters)
- $T_{er}$: portion of $T_e$ resulting from saliency of the poles
- $T_{em}$: portion of $T_e$ resulting from interaction between flux produced by $I_a$ and flux produced by magnet
- $W_f$: energy stored in magnetic field
- $\omega_r$: $d\Theta_r/dt$ Careful examination of the foregoing equations reveals the following unique features of the present invention:

(i) The arcuative field energy $W_f$, which be recovered during current commutation, is greatly reduced because of the much smaller value of the stator 10 inductance. Therefore, the energy ratio, or equivalently, the power factor, is very high. The smaller value of the stator inductance also makes the dynamic response of the motor much faster. Specifically, the stator windings A', B', C' meet small permeances at both aligned and unaligned positions, even though a great deal of permanent magnet flux concentration is achieved under the overlapped pole pairs where electromagnetic torque is produced. In other words, all of the flux produced by the two magnets is concentrated in one relatively narrow stator pole thereby greatly increasing the flux density in the poles compared to the maximum flux density in the magnet itself. As a result, the active stator phase winding will experience very small turn-on and turn-off inductances, thereby facilitating short commutation periods upon turn-on and turn-off.

(ii) Because of the triangle-shaped flux-linkage variation $\lambda_a$, the reluctance torque $\tau_{er}$ will be of zero average if the current is kept constant, as is the case at low speed by chopping. However, the net reluctance torque will be nonzero if the current is varying, as is the case of single pulse operation at high speed. Therefore, the motor will pick up net reluctance torque at high speed, which will compensate for the loss of the reaction torque. This yields a considerable constant power range.

(iii) The reaction torque $\tau_{em}$, which is the dominant torque component, can be produced by applying either a positive current to a stator winding A', B', C' when its flux linkage is increasing (or $E_m > 0$) or a negative current to a stator winding A', B', C' when its flux linkage is decreasing (or $E_m < 0$). This makes it possible to make use of both torque producing zones, thus greatly increasing the torque production capability of the motor, as long as the current can be reversed at aligned position as shown in FIG. 5.

FIG. 5 illustrates the current $i_p$ waveforms, inductance $L_p$ waveforms, and flux $\Phi_p$ waveforms per pole as functions of rotor 16 displacement $\theta_d$.

It can be seen in FIG. 5 that the invention is endowed with a small turn-off inductance L at phase alignment. Hence, the permanent magnet-induced residual flux always assists in current reversal. Note from FIG. 5 that the emf $e_m$ reverses polarity when the poles are aligned. This reversal of polarity actually assists in the current reversal process because it now adds algebraically to the applied voltage. Therefore, it is always possible to power the motor of the present invention using a bi-directional (or bi-polar) converter as well as an unidirectional converter.

To prevent the generation of additional heat, the current provided to the stator windings A', B', C' by a bi-directional converter must be scaled down to $\sqrt{2}/2$ times that for a unidirectional converter. With the scaled current, bi-directional operation will still increase the torque density of the motor by an advantageous $\sqrt{2}$ times. However, it will be appreciated by those skilled in the art that the increase is obtained at the expense of the simplicity and high reliability of a unipolar converter which only requires half diode-bridges.

Control of the invention can be accomplished in the same manner as a conventional variable reluctance motor, i.e., four quadrant operation is easily achieved by changing the sequence of conduction and the direction of current.

Figure 6:
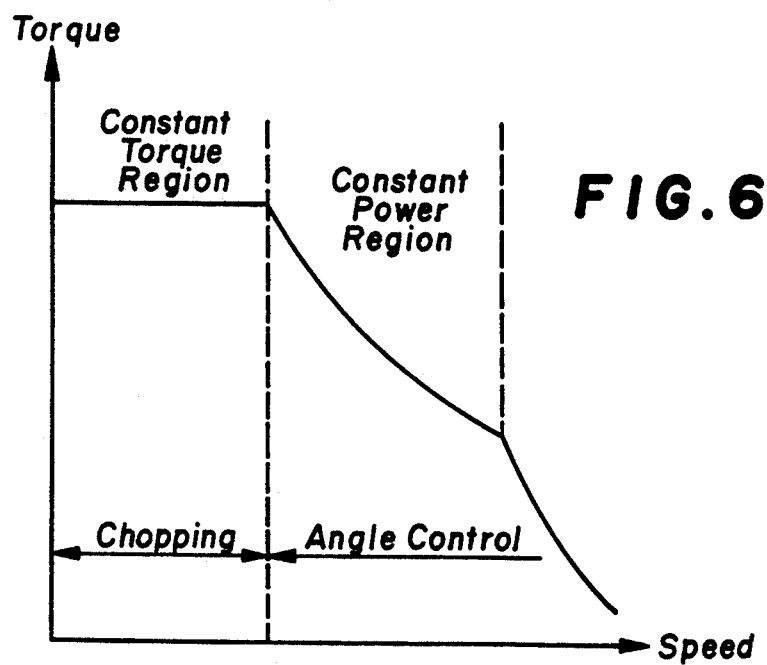
FIG. 6 is a torque capability curve for the embodiment of FIG. 1.

FIG. 6 is a torque capability curve for the present invention showing torque as a function of speed $\omega$. FIG. 6 illustrates the above-described control. Below a base speed $\omega_b$, current chopping is the preferred technique to obtain smoother torque production. Above the base speed $\omega_b$, single current-pulse operation gives a considerable constant power range (field weakening range). The variation of the stator 10/rotor 16 reaction inductance plays a critical role for achieving the constant power range, although the same variation causes torque pulsation in the above-described current-chopping region. While in the current-chopping region, it is possible to program a custom current waveform, such as a ramp, to eliminate the torque pulsation due to reluctance torque at low speed. The presence of reluctance torque in addition to reaction torque during field weakening enhances the torque production during this mode of operation and serves to widen the range for which constant power can be maintained.

It is noteworthy that the residual permanent magnet flux can be monitored by detecting the induced emf in phase that is not carrying current at any instant to detect the rotor 16 position, thus eliminating the need for complex encoders.

Figure 7A:
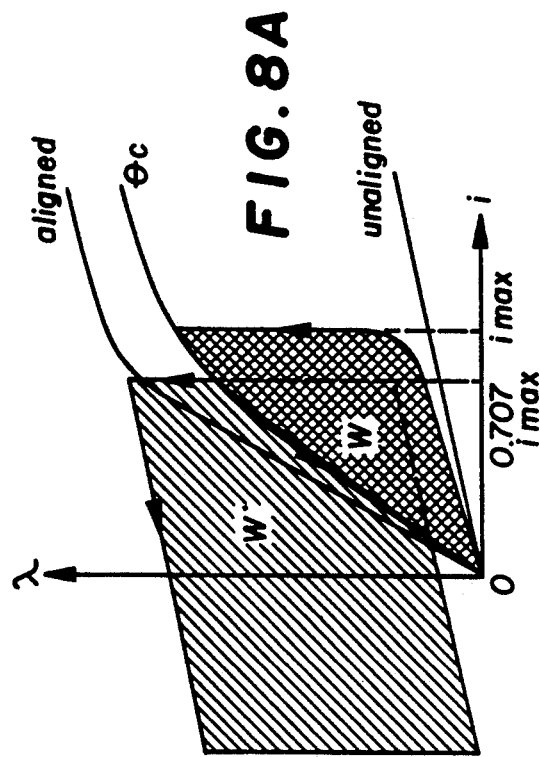
FIG. 7A is a comparative graph showing the flux vs. current loci for small, e.g., 5 KW, version of a conventional switched reluctance motor and a rotary permanent magnet variable reluctance motor RPM-VRM operated with a unipolar converter according to the present invention.
Figure 7B:
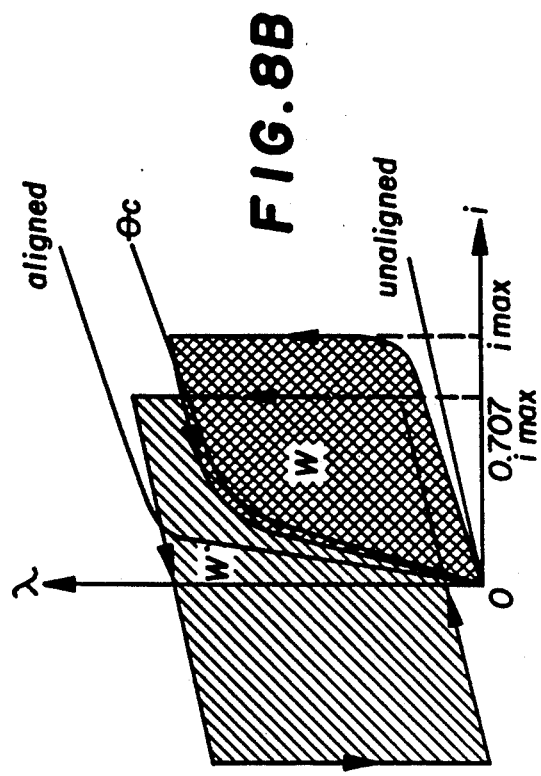
FIG. 7B is a comparative graph similar to FIG. 7A for large, e.g., 100 KW, versions of a conventional switched reluctance motor and a rotary permanent magnet variable reluctance motor RPM-VRM operated with a unipolar converter.

FIG. 7A is a comparative graph showing the flux vs. current loci for small, e.g., 5 kw, versions of a conventional variable reluctance motor and a permanent magnet variable reluctance motor operated with a unipolar converter according to the present invention. The torque produced in one stroke is represented by the area W for the conventional variable reluctance motor and W' for the present invention. As shown in FIG. 7A, the area, W' for the present invention, is bigger than W for the variable reluctance motor due to the fact that the restored field energy i.e., energy returned to the converter supply, represented by the area R, is only a small fraction of the total field energy, and the turn-off occurs closer to alignment because a smaller inductance is encountered. FIG. 7B is a comparative graph similar to FIG. 7A except that the machines being compared are large machines, e.g., 100 KW. The fact that the increase in the area W' over the area W is smaller in FIG. 7B than in FIG. 7A demonstrates that the application of the invention to small machines produces greater advantages than the application of the invention to large machines.

Figure 8A:
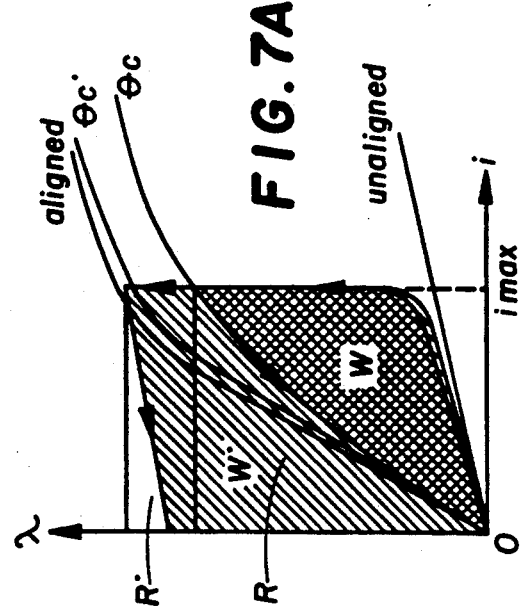
FIG. 8A is a comparative graph showing the flux vs. current loci for small, e.g., 5 KW, versions of a conventional switched reluctance motor a rotary permanent magnet variable reluctance motor RPM-VRM operated with a-bipolar converter according to the present invention.
Figure 8B:
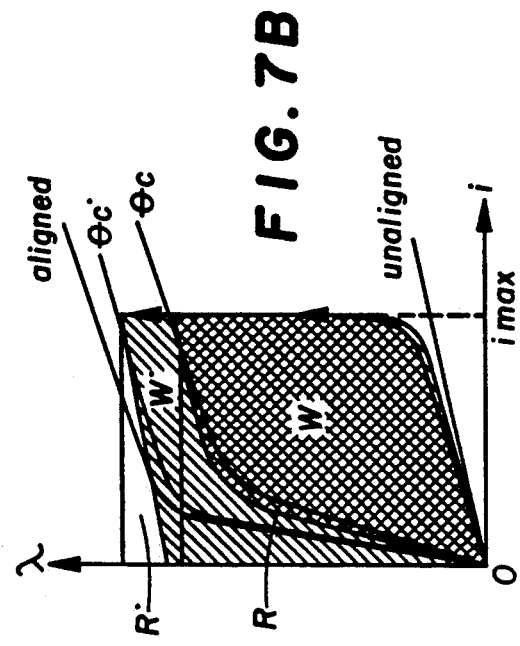
FIG. 8B is a comparative graph similar to FIG. 8A for large, e.g., 100 KW, versions of a conventional switched reluctance motor and a rotary permanent magnet variable reluctance motor RPM-VRM operated with a bipolar converter.

FIG. 8A is a comparative graph showing the flux vs. current loci for small, e.g., 5 kw, versions of a conventional variable reluctance motor and a permanent magnet variable reluctance motor operated with a bipolar converter according to the present invention. As shown, the torque production increases by a factor of $\sqrt{2}$ in the present invention. Hence, it should be clear that the present invention can achieve 2 to 3 times (ideally $\sqrt{2}$ to $2\sqrt{2}$ times) the torque density of that of a comparable switched reluctance motor. FIG. 8B is a comparative graph similar to FIG. 8A except that the machines being compared are large machines, e.g., 100 KW. FIGS. 8A and 8B show that in the case of machines operated with a bipolar converter, the degree of improvement afforded by application of the invention to large machines is nearly the same as the improvement provided by application of the invention to small machines.

Figure 9:
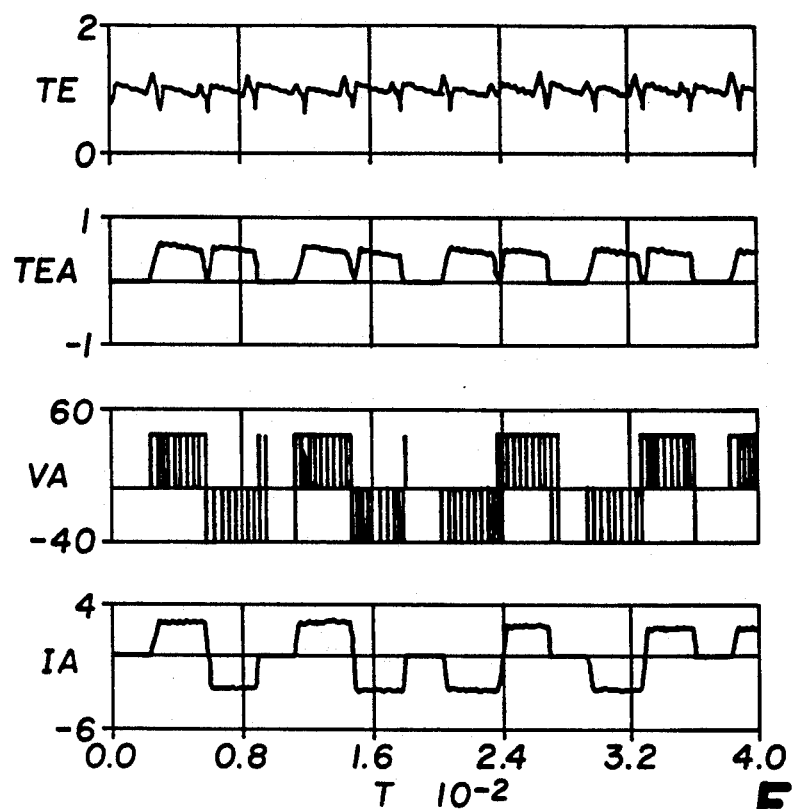
FIGS. 9 and 10 show typical operating waveforms for a low speed and high speed condition.

FIG. 9 is a computer simulation trace showing typical voltage $V_a$, current $I_a$, and torque $T_{es}$ waveforms per phase during low speed operation of the present invention. TEA is the torque produced by phase A and TE is the torque produced by all three phases. The idealized current waveform of FIG. 5 can be accurately approximated by using a pulse width modulated (PWM) inverter. Note that the current $I_a$ of each phase can be rapidly changed from one level to another as was suggested in the idealized waveforms of FIGS. 2 and 5. Also noteworthy is the torque waveform $T_{eq}$ which shows relatively small torque ripple compared to a conventional variable reluctance motor.

Figure 10:
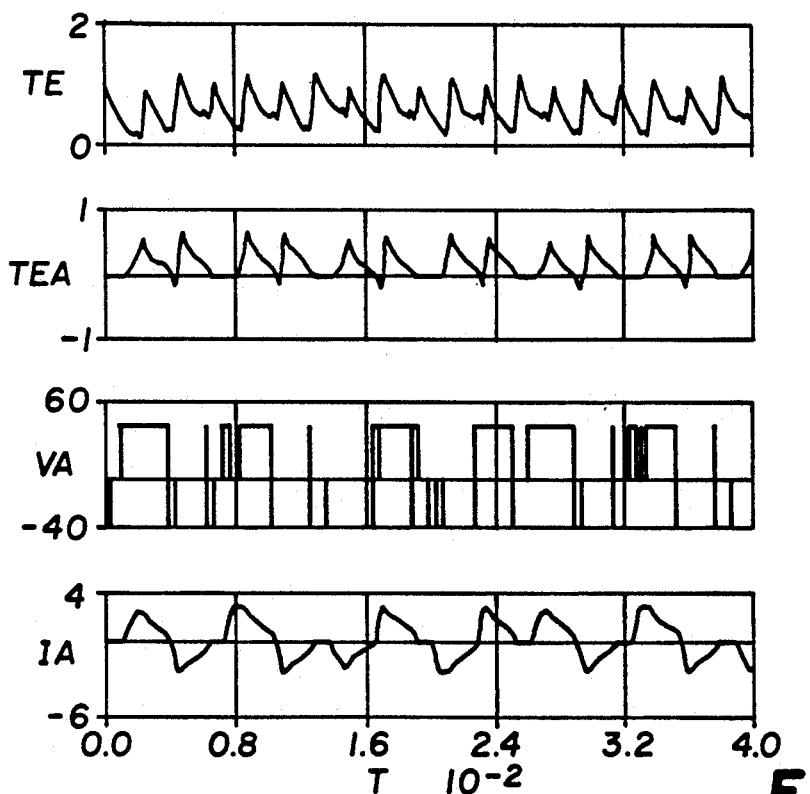

FIG. 10 is a computer simulation trace showing typical voltage $V_a$, current $I_a$, and torque $T_{es}$ waveforms per phase during high speed operation of the present invention. At high speeds, the ideal current waveform of FIG. 5 can not be accurately controlled by means of pulse-width modulation since the counter-emf has increased to a point where it is comparable with the voltage capability of the inverter, i.e., field weakening or constant power mode operation. However, adequate torque production is still possible by delaying the reversal of the current $I_a$ to the point where the emf reverses. In this case, the reverse polarity emf to the applied voltage making possible torque production to a relatively high speed when compared with conventional variable reluctance or conventional permanent magnet motors.

Figure 11:
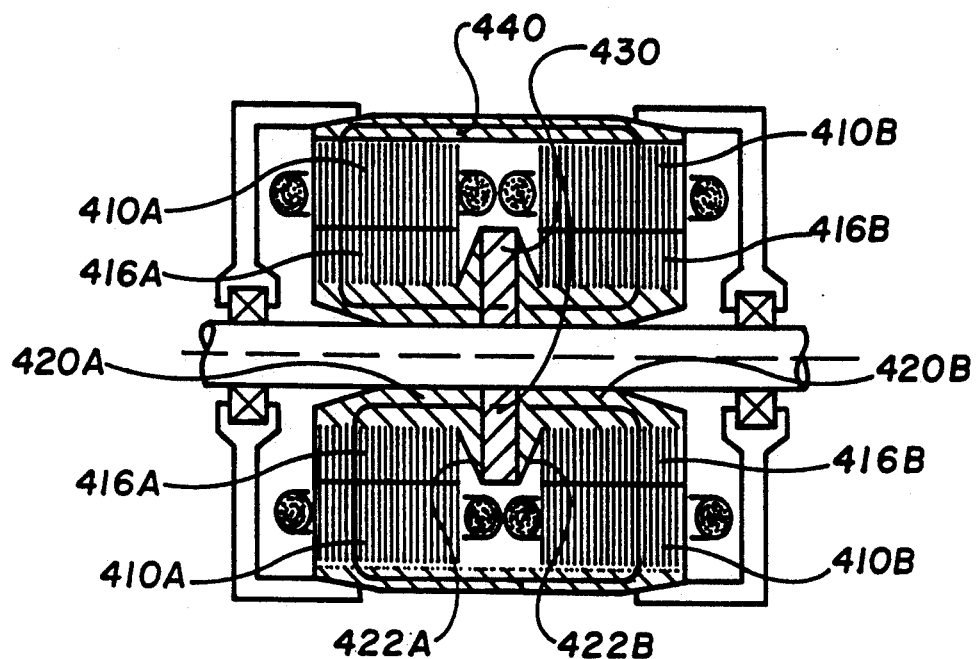
FIGS. 11 and 12 illustrate a side cross-section and a front cross-section, respectively, of a second embodiment of the present invention termed a Homopolar Permanent Magnet Variable Reluctance Motor (HPM-VRM)
Figure 12:
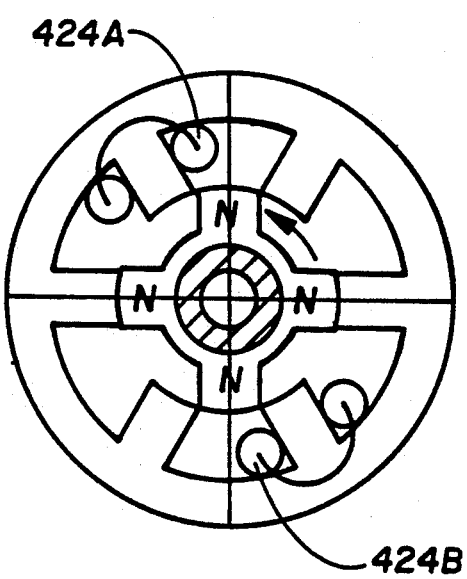

FIGS. 11 and 12 illustrate a side cross-section and a front cross-section, respectively, of a second embodiment of the present invention termed a Homopolar Permanent Magnet Variable Reluctance Motor (HPM-VRM).

In the HPM-VRM embodiment of FIGS. 11 and 12, a stator 410 consists of a plurality of discrete laminated layers which are arranged in two sets of stacks 410A and 410B on opposing ends of a shaft 432. The two stator stacks 410A and 410B are connected magnetically by a cylindrical steel shell 440. As shown in FIG. 12, each stack 410A and 410B is punched in the same manner as the RPM-VRM embodiment of FIG. 1 to yield the same pole arrangement. Likewise, the rotor 416 also consists of a plurality of discrete laminated layers which are arranged in two corresponding sets of stacks 416A and 416B on either end of the shaft. Each stack 416A and 416B is punched in the same manner as FIG. 1. A toroidally shaped permanent magnet 430 is mounted on the rotor between the two stacks 416A and 416B. Alternatively, the permanent magnet 430 can be mounted so as to encircle the rotor member but not rotate with the rotor. In the HPM-VRM embodiment of FIGS. 11 and 12, the rotor shaft lining 420 and a portion of the stator outer case 440 serve as a portion of the primary flux path for the flux generated by the permanent magnet 430. Two steel disks 422A and 422B on both sides of the permanent magnet 430 serve to concentrate the permanent magnet flux in rotor shaft lining 420A and 420B.

All four poles of the left hand side rotor stack 416A are magnetized by permanent magnet 430 to form four north poles as shown in FIG. 12. Hence, flux lines produced by the rotor magnet always cross as the air gap from rotor 416 to stator 410 in the left half side stator/rotor stacks. Conversely, all four poles of the right hand side rotor stack 416B are magnetized by magnet 430 so as to form south poles (not shown). Thus, flux lines produced by the rotor 416 follow a path from right to left along the shaft 432 in the axial direction, then from the left hand rotor stack 410A to the left hand stator stack 416A in the radial direction, then from the left hand stator stack 416A to the right hand stator stack 416B axially via the steel shell 440, and then radially from the right hand stator stack 416B to the right hand rotor stack 410B through the rotor shaft 432 to complete its closed path. The stator windings are wound in such a way that an applied positive current to each phase winding A'-C' will produce flux in the same direction as the permanent magnet flux. The direction of the current in one phase winding of the motor (comprising two coils around diametrically opposed stator poles) is shown in FIG. 12 for the case where the rotor poles are magnetized as north poles by the permanent magnet 430 and the flux linking the opposed stator poles is beginning to increase (counterclockwise rotation is assumed). It is clear that the current in the corresponding poles on the opposite end of the rotor shaft will have the opposite polarity.

The HPM-VRM embodiment of FIGS. 11 and 12 is somewhat complex and bulkier, but it may find application in high speed and high power cases. Since the permanent magnet 430 is located at a distance from the heat sources, they are less likely to be thermally affected. Hence, the HPM-VRM embodiment is well-suited where forced cooling is not available. Otherwise, the operation of the HPM-VRM embodiment is identical to that of the RPM-VRM embodiment of FIG. 1. In addition, the magnet can be designed to produce virtually as much flux as desired since all of the flux produced by the magnet is concentrated in one pair of relatively narrow rotor poles on each of the two rotor stacks. Finally, mounting of the magnet is much simpler and, if desired, the magnet can be mounted such that it does not physically rotate with the rotor member.

Figure 13:
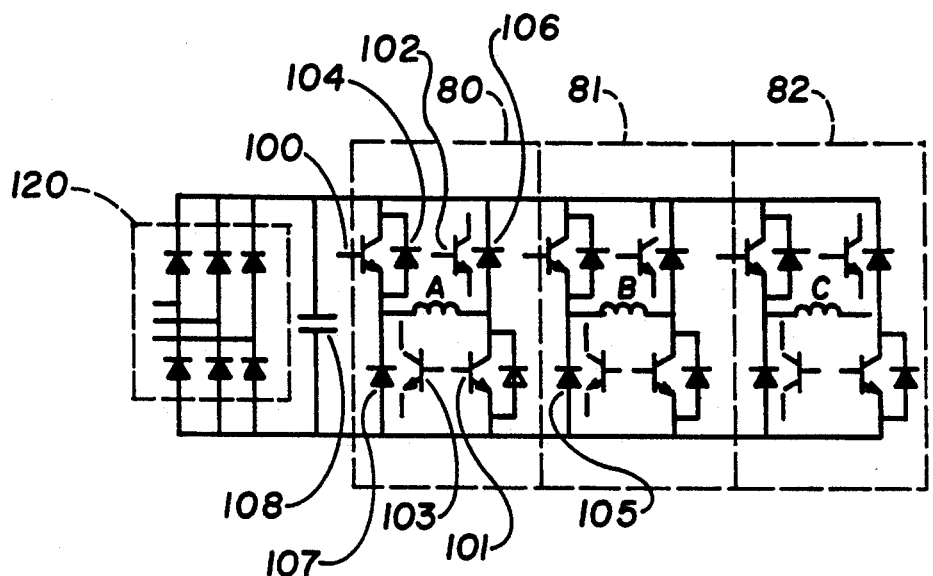
FIGS. 13 and 14 show two alternative converter topologies suited for use in driving the two above-described embodiments of the invention.
Figure 14:
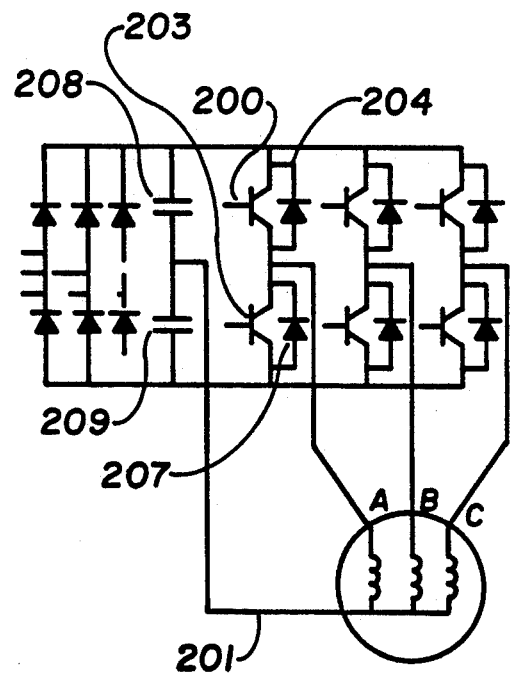

FIGS. 13 and 14 show two alternative converter topologies suited for use in driving the four above-described embodiments of the invention.

In the embodiment of FIG. 13, a bridge rectifier 120 is provided. Bridge rectifier 120 converts a three phase AC power input to unregulated DC. A capacitor 108 is connected in parallel across bridge 120 for smoothing the ripple. Three individual current switches 80-82 are also connected in parallel with bridge rectifier 120 and capacitor 108. Each current switch 80-82 comprises at least two switch devices (for example, switch 80 includes switch devices 100 and 101), which may be conventional transistors or thyristors (with auxiliary commutating means) connected in series with a corresponding one of the stator windings A-C. As shown in the dotted lines, each current switch 80-82 may also include two additional switch devices (for example, switch 80 may include switch devices 102 and 103) for the purpose of making the converter a bi-polar converter. In addition, diodes such as 104-107 are provided in parallel across each one of the switch devices to provide a path for reactive energy flow.

In the embodiment of FIG. 14, the neutral of the machine is connected to a center point on the DC bus by splitting the DC link capacitor 108 of FIG. 13 into two equal capacitances 208 and 209. Only six switch devices are needed as compared with FIG. 13. The function of each of the switch devices is the same as FIG. 13. As was shown in FIG. 2, equal positive and negative currents ideally flow into two of the three phases of the motor while the current in the third phase is zero. Thus, current ideally does not flow in the motor neutral line 201. However, when practical considerations are taken into account as in FIG. 5, small current pulses will flow in this motor neutral line 201 during each period where the motor current transfers from one phase to another. Hence, the effect of this current on the rating of the DC link capacitors will be minimal.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

We claim:

1. A permanent magnet reluctance motor comprising:
   a stator having a plurality of salient poles spaced at equal angular intervals around a central axis;
   a plurality of stator windings, one each of said windings being coiled on one each of said stator salient poles;
   a rotor mounted within said stator for rotation around said central axis, said rotor further comprising,
   a plurality of rotor salient poles spaced at equal angular intervals around said central axis, said rotor salient poles being arranged with respect to said stator salient poles to provide a constant air-gap reluctance during rotation of said rotor within said stator,
   a plurality of permanent magnets embedded in said rotor in two parallel planes on opposing sides of said central axis to serve as a source of flux for magnetizing said rotor salient poles, said magnets being so polarized as to magnetize as south magnetic poles the ones of said rotor salient poles lying on the same side of said central axis as one of said planes and to magnetize as north magnetic poles the ones of said rotor salient poles lying on the same side of said central axis as the other of said planes.

2. The reluctance motor of claim 1, wherein said plurality of permanent magnets further comprises two elongate planar magnets parallelly paced on opposing sides of said central axis.

3. The motor of claim 1, wherein said plurality of stator salient poles further comprises a multiple of six stator salient poles evenly spaced at angular intervals equal to a multiple of $\pi/3$ radians.

4. The reluctance motor of claim 3, wherein said stator salient poles have a pole arc equal to a multiple of $\pi/6$ radians.

5. The reluctance motor of claim 3, wherein said plurality of rotor salient poles further comprises a multiple of four rotor salient poles evenly spaced at angular intervals equal to a multiple of $\pi/2$ radians.

6. The reluctance motor of claim 5, wherein said rotor salient poles have a pole arc of at least $\pi/6$ radians.

7. The reluctance motor of claim 5, wherein the planes of said permanent magnets are angularly displaced by a multiple of $\pi/4$ radians from one of said rotor salient poles.

8. The reluctance motor of claim 5, wherein said stator windings coiled around each two diametrically positioned stator poles are connected in series.

9. The reluctance motor of claim 8, wherein said plurality of stator salient poles further comprises six stator salient poles evenly spaced at angular intervals of $\pi/3$ radians.

10. The reluctance motor of claim 9, wherein said stator salient poles have a pole arc equal to $\pi/6$ radians.

11. The reluctance motor of claim 9, wherein said plurality of rotor salient poles further comprises four rotor salient poles evenly spaced at angular intervals of $\pi/2$ radians.

12. The reluctance motor of claim 11, wherein said rotor salient poles have a pole arc of at least $\pi/6$ radians.

13. The reluctance motor of claim 11, wherein the planes of said permanent magnets are angularly displaced by a multiple of $\pi/4$ radians from a diametric pair of said rotor salient poles.

14. The reluctance motor of claim 11, wherein said stator further comprises three pairs of said series connected stator windings corresponding to three phases, each said pair of series connected stator winding being coiled around two diametric stator salient poles.

15. A permanent magnet reluctance motor comprising:
   a stator having six stator salient poles spaced at equal angular intervals around a central axis, and three stator windings corresponding to three phases, each stator winding being coiled around two diametric stator salient poles;
   a rotor mounted within said stator for rotation about said central axis, said rotor having four salient rotor poles spaced at equal angular intervals around said central axis, said rotor further comprising a plurality of permanent magnets embedded in said rotor in two parallel planes located on opposing sides of said central axis to serve as a source of flux for magnetizing said rotor salient poles.

16. The reluctance motor of claim 15, wherein said rotor salient poles are arranged with respect to said stator salient poles to provide a constant air-gap reluctance during rotation of said rotor within said stator.

17. The reluctance motor of claim 16, wherein said plurality of permanent magnets further comprises two elongate planar magnets parallelly spaced on opposing sides of said central axis.

18. The reluctance motor of claim 17, wherein said stator salient poles are equally spaced at angular intervals of $\pi/3$ radians.

19. The reluctance motor of claim 18, wherein said stator salient poles have a pole arc of $\pi/6$ radians.

20. The reluctance motor of claim 17, wherein said rotor salient poles are equally spaced at angular intervals of $\pi/2$ radians.

21. The reluctance motor of claim 20, wherein said rotor salient poles have a pole arc equal to or slightly greater than $\pi/6$ radians.

22. The reluctance motor of claim 17, wherein the planes of said permanent magnets are angularly displaced by $\pi/4$ radians from one of pairs of diametric rotor salient poles.

* * * * *

UNITED STATES PATENT AND TRADEMARK OFFICE
CERTIFICATE OF CORRECTION

PATENT NO. : 5,304,882

DATED : April 19, 1994

INVENTOR(S) : Lipo et al

It is certified that error appears in the above-identified patent and that said Letters Patent is hereby corrected as shown below:

Column 6, line 10, insert therein -- hence -- .

Column 6, line 60 after "armature" and before "field", insert--reaction--.

Column 7, lines 23, 25 and 46, "A', B', C'" should read -- A, B, C -- .

Column 10, line 12, "they are" should read -- it is -- .

Column 11, line 6, after "of" and before "salient", insert therein -- stator -- .

Column 11, line 34, "paced" should read -- spaced -- .

Signed and Sealed this

Twenty-eighth Day of November 1995

Attest:

BRUCE LEHMAN

Attesting Officer

Commissioner of Patents and Trademarks